UNITED STATES PATENT OFFICE.

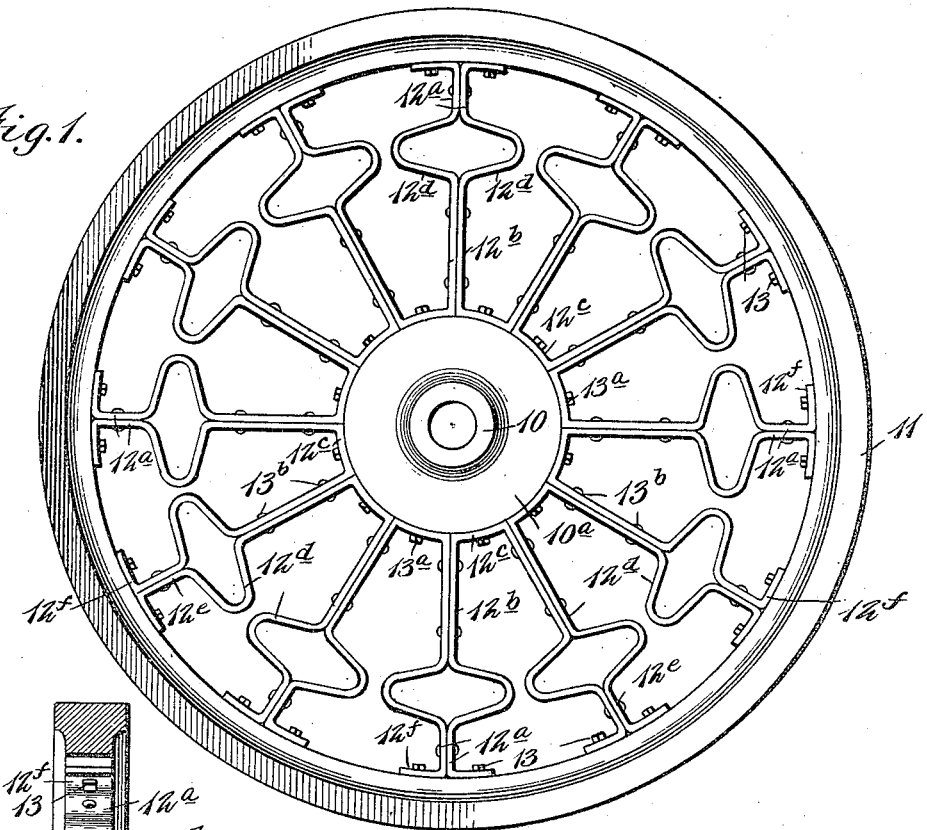

WILLIAM J. SCHAMPEL AND CHRIS H. RASMUSSEN, OF CHICAGO, ILLINOIS.

SPRING-WHEEL.

No. 839,652.　　　　Specification of Letters Patent.　　　Patented Dec. 25, 1906.

Application filed June 30, 1906. Serial No. 324,219.

*To all whom it may concern:*

Be it known that we, WILLIAM J. SCHAMPEL and CHRIS H. RASMUSSEN, citizens of the United States, residing at Chicago, in the county of Cook and State of Illinois, have invented new and useful Improvements in Spring-Wheels, of which the following is a specification.

This invention is a spring-wheel suitable for automobiles or other vehicles, the object being to provide a wheel having a resilient structure without the use of pneumatic or similar tires.

The invention comprises a wheel provided with a hub and a rim or felly and having spokes made of metal with springs interposed between the inner and outer end of said spokes. These spokes especially have some novel features of construction, as shown in the accompanying drawings, in which—

Figure 1 is a side elevation of a wheel embodying features of the invention. Fig. 2 is a cross-section of the same. Fig. 3 is a view of one of the members which form the combined spoke and spring. Fig. 4 is a modification of the same.

In the drawings, 10 indicates the hub having extending around the middle thereof a broad circular flange $10^a$, upon which the spokes are mounted.

11 is the rim or felly.

The spokes are formed of a series of metal strips, one of which is shown in Fig. 3. These strips are assembled so that the branches of adjacent strips when joined together form the spokes and the springs. Each strip is doubled or bent to form two branches $12^a$, united at the inner ends by a segmental portion $12^c$ of proper curvature to fit against the periphery of the rim $10^a$ of the hub. Each of said branches also has a semi-elliptical curve or bend $12^d$ between its ends, and the branch terminates at the outer end in a radial portion $12^e$ and an inturned or offset portion $12^f$ at a proper angle or curvature to fit against the inner side of the rim. The spoke members are arranged in a series around the wheel, and the adjacent branches thereof are secured together by rivets $13^b$, extending through the portions $12^b$ and $12^e$. The ends $12^f$ are fastened to the rim by bolts 13, and the inner connecting portions $12^c$ are fastened to the hub by bolts $13^a$. The assembly of the spoke members produces an elliptical spring in each spoke, formed by the bent portions $12^d$, and these springs give the wheel its resilience or yielding quality. Instead of the rivets $13^b$ other means may be used to fasten the sections together.

The modification shown in Fig. 4 instead of having two branches, as shown in the other figures, has only one branch, being, in effect, a half of the double-spring sections shown in the other figures. This modified form is, however, assembled the same way and when assembled produces a wheel of similar construction.

We claim—

A spring-wheel comprising a hub, a rim, and spoke-sections therebetween, each section consisting of a metal strip bent to form two radial branches connected at their inner ends by a segmental portion $12^c$ which is secured to the hub, each branch having at its outer end an offset portion $12^f$ secured to the rim, and also having a semi-elliptical bend $12^d$, the adjacent branches of the successive sections being secured together.

In testimony whereof we have signed our names to this specification in the presence of two subscribing witnesses.

WILLIAM J. SCHAMPEL.
　　　　　　　　CHRIS H. RASMUSSEN.

Witnesses:
　　SIGNA FELTSKOG,
　　H. G. BATCHELOR.